United States Patent

Butter

[15] 3,696,676
[45] Oct. 10, 1972

[54] METHOD AND ARRANGEMENT FOR INSTALLING MEASURING FEELERS

[72] Inventor: Karl Butter, Munich, Germany

[73] Assignee: Messerschmidtt-Bolkow-Blohm Gesellschaft mit beschrankter Haftung, Ottobrum near Munich, Germany

[22] Filed: May 26, 1970

[21] Appl. No.: 40,562

[30] Foreign Application Priority Data

May 28, 1969  Germany..........P 19 27 147.7

[52] U.S. Cl..................73/343 R, 73/362.8, 136/232
[51] Int. Cl...............................................G01k 1/16
[58] Field of Search.....73/343, 362.8, 346, 362, 362 AR; 136/233, 231, 232; 72/354, 358; 277/201

[56] References Cited

UNITED STATES PATENTS

| 1,658,950 | 2/1928 | Stein | 73/343 |
| 2,516,952 | 8/1950 | Bristol | 136/233 |
| 3,040,579 | 6/1962 | Taylor | 73/343 |
| 2,670,973 | 3/1954 | Ginther | 277/201 |

Primary Examiner—Louis R. Prince
Assistant Examiner—Denis E. Corr
Attorney—McGlew and Toren

[57] ABSTRACT

A measuring feeler is incorporated in a bore of a workpiece by surrounding it with a filling material which is softer than that of the feeler and the workpiece and by applying a compressive pressure to the softer material to cause its plastic deformation and tight engagement with the bore of the workpiece and with the temperature feeler. The feeler is installed in the bore of the workpiece by orienting a counter member or rod at the end of the bore at which the feeler end is to be exposed, positioning the feeler end to engage the rod, applying the softer material around the rod and thereafter applying pressure to the softer material from the opposite end of the bore in the direction of the rod to tightly seal the feeler and the soft material in respect to the bore of the workpiece. The softer material surrounds the measuring feeler in the form of a sleeve having an outer jacket or dimension such that it bears tightly against the workpiece in the recesses or grooves thereof.

9 Claims, 3 Drawing Figures

PATENTED OCT 10 1972 3,696,676
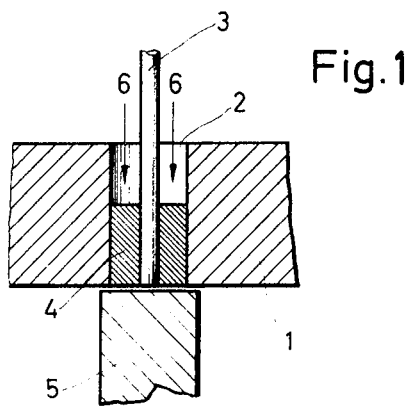
Fig. 1
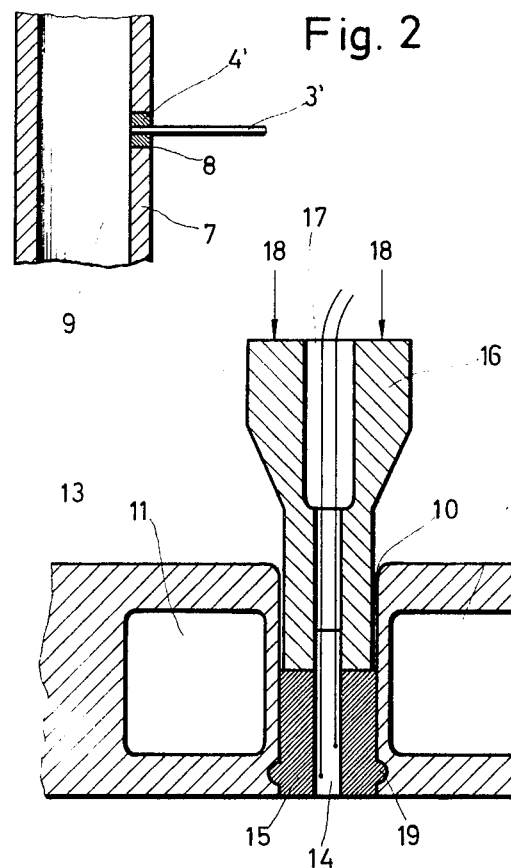
Fig. 2
Fig. 3
INVENTOR
Karl Butter
By McGlew & Toren
ATTORNEYS

METHOD AND ARRANGEMENT FOR INSTALLING MEASURING FEELERS

SUMMARY OF THE INVENTION

This invention relates in general to a method and apparatus for installing measuring feelers and in particular to a new and useful method and apparatus for installing a measuring feeler such that it will be in close heat transfer relationship with a workpiece.

In using a measuring feeler such as, for example, probes for a temperature indicating or measuring device at the location of a workpiece to be tested or measured, it is necessary that the feelers be mounted so that they will be insensitive to mechanical stresses. It is essential that the necessary securing elements for such feelers be such that they do not interfere with the data which must be assembled by the use of the feelers so that disturbancies, such as heat loads on the workpiece etc., will not be transmitted to the measuring device and interfere with the correct and precise transmission of the necessary data. Because of local mechanical or thermal excess stresses which may arise in the assembly, or by the fixing of the measuring feeler, changes may be caused in the structure about the measuring feeler itself and also of the test piece. These changes in turn may result in inaccurate measurements and therefore such changes must be prevented.

The mounting of a measuring feeler is generally accomplished by welding, soldering, cementing or by a mechanical screw connection. The precise manner of fixing the feelers is adapted to the respective area to which the measurements have to be made. In those instances where the mounting or fixing of the feelers requires a local supply of heat as, for example, welding or soldering, a satisfactorily mounting is only possible if, subsequently during operation no difficulties occur from a heat technical point of view. However, such difficulties do occur if the structure involved is the wall of a combustion chamber or other high temperature device having complicated cooling systems, such as are applicable to the construction of rocket engines. In such a case, danger exists that the volume of an assembly of different metals or metal alloys will be changed in a different manner corresponding to the different expansion co-efficient of the metals or the alloys. This in turn results in a worsening of the current and/or heat and/or force connection. The term "connections" as used above indicates a direct or indirect surface-like contact between the materials which causes satisfactory heat transfer without deterioration of the heat conduction capacity.

Cemented connections between measuring feelers and workpieces are usually not sufficiently homogeneous and this is particularly so if the cemented area is subjected to a fluctuating temperature conditions. The current, heat and force connection is thus not satisfactory in a cemented structure. The same applies to a screw connection.

The size of the measuring feeler as well as the accessibility of the place of its mounting in the workpiece are of importance. These factors negatively influence or obstruct what would otherwise be a satisfactory mounting. If the measuring probes are small or even minute or have to be secured in a predetermined defined manner in the walls of the workpieces, then they cannot be locally heated without causing undesired structural changes and stresses in the workpiece.

It is already known to provide a form locking and pressure resistant connection, using a guide bushing for a nozzle closure member which is secured and mounted by means of a hollow plug or prop. The hollow plug is pressed into the recessed area and is deformed by pressure in an axial direction to cause the material of the plug to be displaced or moved into an annular groove of the casing. A form locking connection, however, is only achieved between the plug and the surrounding casing. It is also known to secure a measuring feeler within a recess or bore of a workpiece by applying a special soft solder around the exterior of the feeler and soldering it into place. Such a method is uneconomical since it requires a considerable expenditure of time. In addition, it is not easy to control the amount of filling which may be accomplished with such soldering method. In addition, it is possible that the soldering metal which is brought to a flowing state sometimes fills only portions of the annular gap surrounding the feeler, and, if locally heating takes place, there is a danger of deformation and structural changes of the workpiece. In addition, instrumentation may be damaged by local or one-sided heating. Heating of the whole workpiece is not usually possible or feasible from an economical standpoint. The soldering method has a further disadvantage that dependent on the solder type which is employed there is a possibility that it might have to be effected under a protective gas atmosphere.

In accordance with the present invention there is provided an arrangement by means of which measuring feelers, including measuring feelers of very small and minute dimensions, can be secured in a recess of a workpiece in a defined location while preventing or avoiding any damage as well as undesired stress of the structure of the metals of the measuring device and of the workpiece itself. The inventive arrangement is such that an excellent current, heat and force-connection is accomplished, and complete tightness and high stability of the mounting joint is effected so that it can withstand high pressures. The measuring feeler is mounted within a recess of a workpiece such that it will be in close heat-transfer contact with the workpiece by filling the space between a large bore in the workpiece and the measuring feeler with a material which is softer than that of the measuring feeler and the workpiece. In the preferred arrangement, the softer material is predominantly introduced by means of a plastic deformation and without the use of heat and it provides a firm interengagement between the workpiece and the workpiece and the measuring feeler. It is of an advantage that the heat conducting portion of the softer material is at least as high as that of the measuring feeler and the workpiece. The softer material may advantageously surround the measuring feeler in the form of a sleeve having an outer surface which engages or bears against the workpiece. The arrangement is such that there is a form-locking connection not only between the surrounding material and the workpiece but also between the surrounding material and the temperature feeler itself. The surrounding connection of the feeler to the workpiece provides a current transmissive, heat transmissive and force transmissive connection.

Accordingly, it is an object of the invention to provide an improved arrangement of a measuring feeler in a recess or bore of a workpiece which is characterized by the fact that the bore is filled in the area around the feeler with material which is softer than that of the feeler and the workpiece.

A further object of the invention is to provide a measuring feeler installation for a workpiece such as a combustion chamber which includes a bore therethrough comprising a central measuring feeler arranged centrally within said bore, soft or ductile material arranged around said feeler having heat and current conductive characteristics and extending from the inner edge of the bore inwardly to a predetermined distance; and a mounting bushing for the feeler surrounding the feeler and compressing the softer material into tight engagement with both the feeler and the workpiece.

A further object of the invention is to provide a method for producing a mounting of a measuring feeler in a recess or bore of a workpiece which comprises arranging the feeler within the bore with its measuring end oriented in a predetermined plane or location, and applying a softer material around the measuring feeler by plastic deformation.

A further object of the invention is to provide a measuring feeler installation which is simple in design, rugged in construction, and economical to manufacture, The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a partial sectional view of a workpiece having a temperature feeler installed in a bore thereof in accordance with the invention;

FIG. 2 is a partial sectional view of a measuring feeler located in a pipe-wall; and FIG. 3 is a partial axial sectional view of a measuring feeler arranged in a wall of a rocket combustion chamber.

GENERAL DESCRIPTION OF THE PREFERRED EMBODIMENTS

Referring to the drawings in particular, the invention embodied therein, in FIG. 1, comprises a measuring feeler or feeler rod 3 which is centrally arranged within a bore 2 of the workpiece 1. A sleeve 4 of a softer material fills the interspace between the outer surface of the feeler 3 and the wall of the bore 2. The sleeve 4 comprises a soft material such an annealed silver having good temperature and current transmission characteristics and which provides a good force connection between it and the feeler 3 and between it and the workpiece 1.

In accordance with the method of the invention, the material of the sleeve 4 is applied by plastically deforming the material by compression or pressing in the direction of the arrow 6. In the arrangement of FIG. 1, a counter-member or rod 5 is positioned to close off the bore 2 and is oriented at a plane at which the exposed open end of the feeler 3 is to lie. With the rod member 5 in place, the material 4 is plastically deformed or compressed to snuggly bear against the wall of the bore 2 and also against the outer surface of the measuring feeler 3. All unevennesses of both surfaces are fully filled out by the material 4. The measuring feeler 3 can thus not be moved and is stationarily located in the bore 2 in an excellent electrically conducting and heat- and force-transferring manner. The diameter of the rod 5 is larger than that of the bore 2 so that, by counter holding the rod 5, its outer rim rests on the workpiece 1. In this manner, the end surface of the measuring feeler 3 which has been fixed in a manner described, will be in alignment with the boundary surface of the interior of the workpiece 1.

In FIG. 2, there is shown a greatly enlarged sectional view of a conduit 7 having a measuring feeler 3' which is installed in a bore 8 of the conduit 7 and secured therein by plastically deformable sleeve 4 in a manner described above. The interior 9 of the conduit 9 of the conduit 7 carries material which flows past the end of the feeler 3' directly and without any loss of pressure because of the smooth installation of the end of the feeler 3. Thereby an exact and unfalsified measuring result is assured.

In the embodiment of FIG. 3, there is shown a rocket combustion chamber having a wall 13 with cooling channels 11 and 12 and a bore 10. In this embodiment a temperature feeler 14 is centrically inserted into the bore 10 and it is constructed as a measuring feeler. The feeler 14 issurrounded by a sleeve 15 of a softer material whose outer walls bears against the wall of the bore 10 and tightly against the wall of the feeler 14.

A bushing is arranged around the outer or upper portion of the feeler 14 and it bears against the sleeve 15. The feeler 14 is arranged in the bore 17 of the bushing 16.

Forces are applied in the direction of the arrows 18 on the bushing 16 to cause the soft material of the sleeve 15 to be compressed into the surface and unevenness of both the feeler 14 and of the bore 10. In this manner without the use of heat, but rather by cold pressure deformation, a force locking electrically conducting connection is created between the feeler and the sleeve 15 and the wall bounding the bore 10 of the combustion chamber wall 13. A connection is created between the structural members which does not negatively affect the heat flow from the wall of the combustion chamber to the temperature feeler 14. By providing a groove 19 or other form locking means in the cylindrical bore 10, the force contact of the connection can be increased.

The material of the sleeve 4, 4' and 15 is advantageously a very soft metal material such as a soft annealed silver.

What is claimed is:

1. An arrangement of a measuring feeler in a recess or bore of the workpiece, comprising a workpiece having a recess, a measuring feeler rod located within said recess, and a sleeve of a pressure deformable heat and current conductive material surrounding said measuring feeler rod and being compressibly deformed into sealing engagement with said measuring feeler rod and said workpiece.

2. An arrangement, according to claim 1, including a bushing surrounding said temperature feeler and having an inner end portion arranged in the bore overlying said sleeve said sleeve having an end flush with said feeler rod at the interior of said workpiece.

3. An arrangement, according to claim 4, wherein said workpiece comprises a combustion chamber having cooling channels therein said feeler rod being arranged with its end at the interior of said combustion chamber.

4. An arrangement according to claim 1, wherein said heat and current conductive material comprises a metal.

5. An arrangement according to claim 4, wherein said metal comprises annealed silver.

6. A method of installing a measuring feeler within a bore or recess of a workpiece, comprising centering the measuring feeler within the recess or bore, applying a sleeve of a conductive material softer than the temperature feeler and the workpiece around the measuring feeler and within at least a portion of the recess or bore, and applying a deformable pressure to deform the softer material into force, current and heat-conducting engagement with the temperature feeler and the workpiece.

7. A method, according to claim 6, wherein the softer material which is employed is an annealed silver.

8. An arrangement of a measuring feeler in a bore or recess of workpiece, comprising a workpiece having a bore extending therethrough, a counter rod member positioned to close the bore at the measuring end thereof, a measuring feeler rod located within said recess, and a sleeve of a pressure deformable material surrounding said measuring feeler rod and being compressibly deformed into sealing engagement with said measuring feeler rod and said workpiece, said feeler rod being positioned against the surface of said rod member at the interior of the workpiece, said sleeve being deformed against said rod member.

9. A method of installing a measuring feeler within a bore of a workpiece having a bore extending through the wall thereof, comprising centering the measuring feeler within the bore, applying a sleeve of a conductive material softer than the temperature feeler and the workpiece around the measuring feeler and within at least a portion of the recess or bore, applying a deformable pressure to deform the softer material into force, current and heat-conducting engagement with the temperature feeler and the workpiece, arranging a counter member at the side of the bore at which the end of the measuring feeler is to be positioned, thereafter positioning the feeler member to cause engagement of the end thereof with the counter member, and applying pressure to the sleeve member on the side opposite to the counter member to cause it to deform into engagement with the workpiece and the temperature feeler.

* * * * *